United States Patent
Marmur (10) Patent No.: US 6,626,587 B1
(45) Date of Patent: Sep. 30, 2003

(54) METHOD AND SYSTEM FOR TRANSMITTING OPTICAL COMMUNICATION

(75) Inventor: Oren Marmur, Yel-Aviv (IL)

(73) Assignee: ECI Telecom Ltd., Petach-Tikva (IL)

( * ) Notice: Subject to any disclaimer, the term of this patent is extended or adjusted under 35 U.S.C. 154(b) by 0 days.

(21) Appl. No.: 09/500,824

(22) Filed: Feb. 10, 2000

(30) Foreign Application Priority Data

Nov. 3, 1999 (IL) ................................. 132726

(51) Int. Cl.[7] .............................................. H04B 10/08
(52) U.S. Cl. ............................. 398/17; 14/38; 370/228
(58) Field of Search .............................. 359/110, 117, 359/119, 124; 370/228, 227, 395.42

(56) References Cited

U.S. PATENT DOCUMENTS

| | | | | |
|---|---|---|---|---|
| 4,393,493 A | * | 7/1983 | Edwards ..................... | 370/228 |
| 4,663,520 A | | 5/1987 | Tanaka et al. | |
| 5,229,593 A | | 7/1993 | Cato | |
| 5,510,917 A | * | 4/1996 | Corke et al. ................ | 359/110 |
| 5,933,258 A | * | 8/1999 | Flanagan et al. ............ | 359/110 |
| 6,005,694 A | * | 12/1999 | Liu ............................. | 359/110 |
| 6,075,629 A | * | 6/2000 | Al-Salameh et al. ........ | 359/110 |
| 6,195,186 B1 | * | 2/2001 | Asahi .......................... | 359/110 |
| 6,266,168 B1 | * | 7/2001 | Denkin et al. .............. | 359/110 |
| 6,407,834 B1 | * | 6/2002 | Takeshita et al. ........... | 359/110 |

FOREIGN PATENT DOCUMENTS

| | | |
|---|---|---|
| EP | 0 859 484 | 8/1998 |
| EP | 0 932 244 | 8/1999 |
| WO | 97 24822 | 7/1997 |

OTHER PUBLICATIONS

Li et al., "Automatic Fault Detection, Isolation, and Recovery in Transparent All-Optical Networks", *Journal of Lightwave Technology*, (1997), vol. 15, No. 10, pp. 1784–1793.

* cited by examiner

*Primary Examiner*—Leslie Pascal
*Assistant Examiner*—David C. Payne
(74) *Attorney, Agent, or Firm*—Browdy and Neimark, P.L.L.C.

(57) ABSTRACT

An optical transmission system comprising a plurality of telecommunication channels, characterized in that when a failure occurs in one or more of said telecommunication channels, a continuous operation of the non-failing telecommunication channels is enabled, provided that the overall transmitted energy in said non-failing telecommunication channels exceeds a pre-defined threshold.

2 Claims, 8 Drawing Sheets

METHOD AND SYSTEM FOR TRANSMITTING OPTICAL COMMUNICATION

FIELD OF THE INVENTION

The present invention relates in general to optical systems, and in particularly to optical telecommunication systems and to methods of increasing the safety of their use.

BACKGROUND OF THE INVENTION

Laser safety standards (IEC) in telecommunication systems require appropriate safety measures, and especially in case of a fiber break. Such safety measures might include Automatic Power Reduction (to be referred to hereinafter as "APR") or Automatic Laser Shutdown (to be referred to hereinafter as "ALS").

Continuously operating lasers have been employed in a variety of applications. Using means for interrupting the laser beam is a normal practice in such applications to avoid hazardous emissions. U.S. Pat. No. 4,663,520 describes such a fail-safe laser apparatus in which a shutter may intercept or attenuate the laser beam avoiding undesired emission of the laser beam once a predefined radiation threshold is breached.

Another approach to the problem is described in U.S. Pat. No. 5,229,593. The system disclosed by this patent, includes a microprocessor to control the laser output beam to a safety level when the input bean indicates that the output beam is not being received at the remotely positioned terminal.

The laser safety issue in optical transport telecommunication systems has been addressed among others, in ITU-T Recommendation G.664, based on the IEC 60825 laser safety standard. In accordance with this recommendation, a complete optical transport system can be regarded as a Class 1 (low hazard) laser product, since under normal operating conditions the emissions are completely enclosed and no light should be emitting outside the enclosure.

However, when the fiber breaks or an optical connector is unplugged, there exists a risk of a potentially hazardous exposure, assuming the internal emitters are of high enough power.

In accordance with IEC 60825, the hazard level of equipment is defined as one that should not exceed level 3A (+17 dBm in the 1550 nm region) in restricted locations and level 3B (+27 dBm in the 1550 nm region) in controlled locations.

Although in some cases the threshold of the allowed hazard level will not be exceeded, still, in order to provide appropriate shutdown operation of inserted stand-alone boosters and pre-amplifiers in optical transport systems, it might be useful to provide shut down features also at lower hazard levels.

One of the main disadvantages associated with the prior art solutions described, is, that once a failure occurs in one channel out of a plurality of channels, the traffic transmission in all the remaining channels is stopped. However, in a system that comprises a large number of channels, it may happen from time to time that the communication in at least one channel fails due to reasons other than the breaking of the fiber (e.g. laser malfunctioning, etc.). In such a case it would obviously be undesirable that the communication in all channels is automatically blocked.

SUMMARY OF THE INVENTION

It is an object of the present invention to provide an optical system that allows continued operation of non-failing channels, when a failure occurs in some channels of that system.

It is yet another object of the present invention to provide a system that further comprises protection means that allow diversion of traffic from failing channel to a protection channel.

It is still another object of the present invention to provide method for allowing continued operation of non-failing channels when some of the system's channels are not functioning, with or without using a protection channel in the system.

Other objects of the invention will become apparent as the description of the invention proceeds.

In accordance with the present invention there is provided an optical transmission system comprising a plurality of telecommunication channels, characterized in that when a failure occurs in one or more of said telecommunication channels, a continuous operation of the non-failing telecommunication channels is enabled, provided that the overall transmitted energy in said non-failing telecommunication channels exceeds a pre-defined threshold.

According to an embodiment of the invention, the optical transmission system comprises:

a plurality of optical transmitters;

a wave division multiplexer receiving outputs from said plurality of optical transmitters over a plurality of optical channels;

an optical link;

a wave division demultiplexer receiving an input from said division multiplexer over said optical link;

a plurality of optical receivers, each receiving an input from said wave division demultiplexer;

a determination means for determining whether the energy of the input received from said division multiplexer exceeds a pre-defined threshold; and a blocking means controlled by said determination means and operative to intercept all laser beams leaving said wave division multiplexer.

According to still a another embodiment of the invention, the optical transmission system further comprises:

at least one optical splitter;

a detector receiving input from said at least one optical splitter;

wherein the wave division demultiplexer receiving an input from said division multiplexer over said optical link and providing outputs to the at least one optical splitter. Preferably, the optical transmission system comprises a plurality of optical splitters, each of which is operative to split the input received thereby so that a part of the input is transmitted to the detector and the remaining of the input is transmitted to a corresponding one of the plurality of optical receivers. Based on the input received at the detector, the determination means are operative to determine whether the energy of the input thus received exceeds a pre-defined threshold.

By another embodiment of the invention the blocking means comprises a switching mechanism. Such a mechanism may comprise an optical switch, or alternatively, a shutter movable between open and closed positions, adapted for completely intercepting all laser beams incident thereon in its closed position.

In yet another embodiment of the present invention, there is provided an optical transmission system comprising a plurality of telecommunication channels extending between a first and a second locations, wherein a plurality of channels are operative for carrying traffic in normal operating mode from the first location to the second location and at least one channel is adapted to operate as a protection channel, characterized in that when a failure occurs in one or more of said telecommunication channels, a continuous operation of the non-failing telecommunication channels is enabled, provided that the overall transmitted energy in said non-failing telecommunication channels exceeds a pre-defined threshold. Thus, when a failure occurs in one or more of the telecommunication channels carrying traffic in normal operating mode, the traffic of at least one of the failing channels is transmitted via the at least one protection channel.

According to still another embodiment of the present invention, the protection channel is a non-active redundant channel that may be activated upon detection of LOS in a forward channel.

In accordance with another embodiment of the invention in the optical transmission system provided, at least one of a plurality of channels operative for carrying traffic in normal operating mode is assigned a higher priority than at least one other channel of the plurality of channels operative for carrying traffic in normal operating mode, and in the event that a failure occurs in the higher priority channel, the system is adapted to divert the traffic from the failing channel to said lower priority channel.

By a preferred embodiment of the invention there is provided an optical transmission system comprising:
  a plurality of optical transmitters;
  a wave division multiplexer receiving outputs from said plurality of optical transmitters over a plurality of optical channels;
  an optical link;
  a wave division demultiplexer receiving an input from said division multiplexer over said optical link;
  a plurality of optical receivers, each receiving an input from said wave division demultiplexer;
  a determination means for determining whether the energy received from said division multiplexer over the optical link exceeds a pre-defined threshold;
  a blocking means operative to block all laser beams leaving said wave division multiplexer responsive to a determination of said determination means that the energy thus received does not exceed the pre-defined threshold; and
  a protecting means operative to divert traffic from said at least one failing forward channel to at least one protection channel in the event of a fault occurring in said at least one forward channel, provided that the energy of the input received from said division multiplexer over the optical link exceeds the pre-defined threshold.

One option of carrying out the latter embodiment is by assigning one protection channel for protecting one pre-designated channel out of the plurality of telecommunication channels. Alternatively, one protection channel may be used for protecting a plurality of telecommunication channels.

According to another aspect of the present invention, in an optical transmission system comprising a plurality of telecommunication channels extending between a first and a second locations and carrying traffic from the first location to the second location, a method is provided for allowing continuous operation of non-failing channels provided that the overall transmitted energy in the non-failing channels exceeds a pre-defined threshold, and allowing the diversion of the traffic from the failing channel(s) to protection channel(s), correspondingly.

By still a further embodiment of the invention, there is provided a method for routing traffic to the protection channel in an optical transmission network comprising a plurality of forward telecommunication channels extending between a first and a second locations carrying traffic in normal operative mode from the first location to the second location and at least one protection channel for carrying traffic of at least one forward channel in the event of a fault in at least said channel, provided that the overall transmitted energy in the non-failing channels exceeds a pre-defined threshold.

Preferably, this method comprises the steps of:
  detecting a fault on at least one channel at the second location;
  determining whether the total energy received from the plurality of telecommunication channels at the second location exceeds a pre-defined threshold;
  in the case that the total energy thus received exceeds the pre-defined threshold, switching at the second location the transmission path associated with said at least one failing channel to the at least one protection channel;
  detecting a fault on said at least one channel at the first location;
  determining whether the total energy received from said plurality of channels at the first location exceeds the pre-defined threshold; and
  in the case that the total energy thus received exceeds the pre-defined threshold, switching at the first location the transmission path associated with said at least one failing channel to the at least one protection channel.

According to another embodiment of the invention, in an optical transmission system comprising an optical link extending between first and second locations and carrying communication traffic in a normal operation mode from the first location to the second location, and a protection link for carrying communication traffic in the event of a fault in said optical link, a method is provided for managing routing of traffic to the protection link, provided that the overall transmitted energy in the failing link does not exceed a pre-defined threshold.

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1:
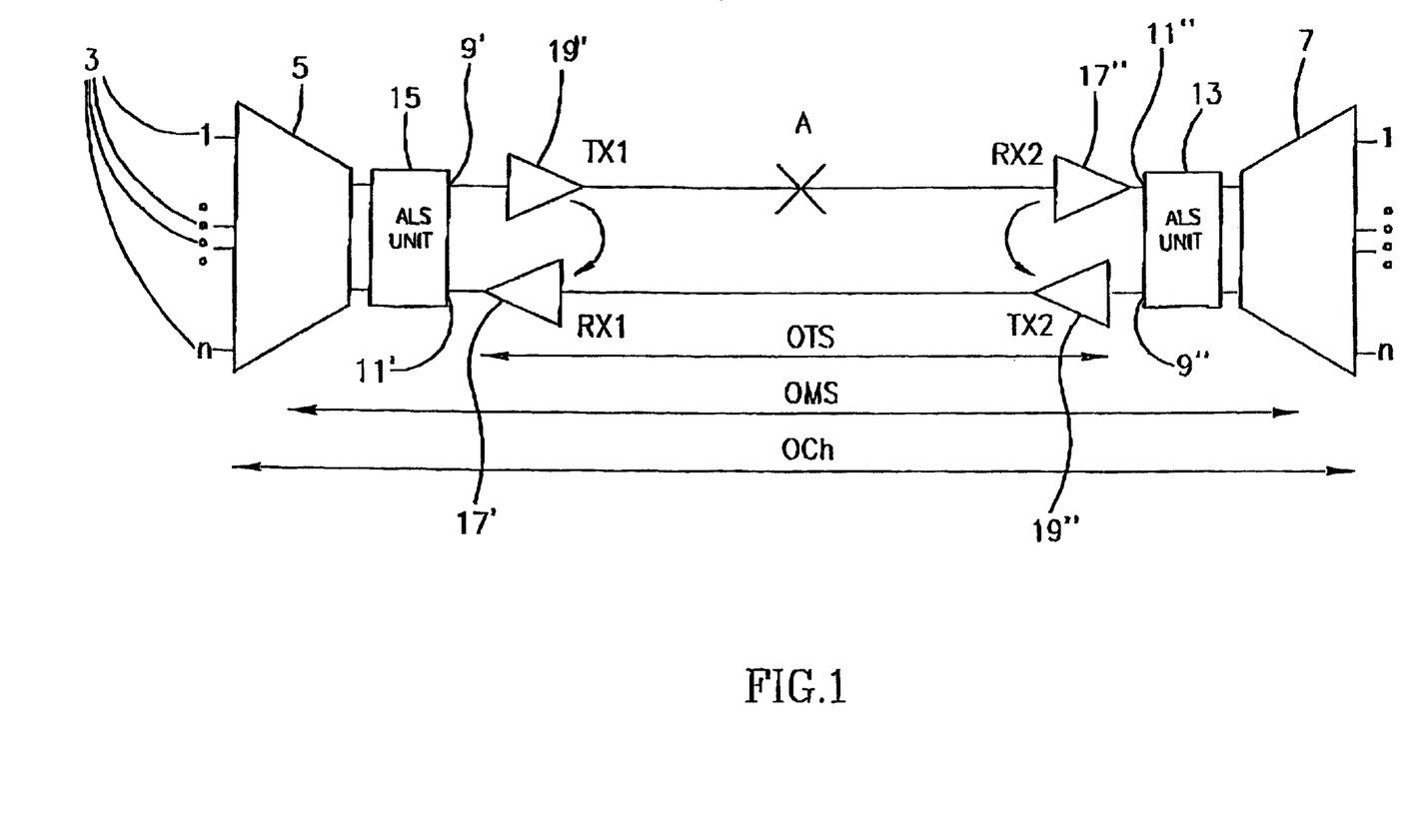
FIG. 1 is a simplified illustration of the communications system constructed and operative in accordance with a preferred embodiment of the present invention.

Reference is now made to FIG. 1, which illustrates schematically a preferred embodiment of a wave division multiplexing communications system constructed and operative in accordance with a preferred embodiment of the present invention.

The system 1 illustrated in FIG. 1 is one having no in-line amplifiers (although the invention should not be considered to be limited by such a restriction). The system comprises two terminals 5 and 7, to each of which a plurality of channels 3 are connected, and the two terminals are connected to each other via optical links. As may be appreciated by a man skilled in the art, the system might also include further components e.g. pre-amplifiers 19' and 19" and/or boosters 17' and 17". In other words, the system provided by the present invention may be implemented with or without pre amplification devices and/or boosters.

Terminals 5 and 7 each comprising a wave division multiplexer/demultiplexer, a plurality of optical splitters, and interfaces for transmitting/receiving the mutiplexed transmission to/from the other terminal.

For the sake of simplicity, the interface located between the laser output and the optical fiber, TX, and the interface between the optical fiber and the receiver input, RX, of terminals 5 and 7 are shown as separated therefrom and are designated by 9' and 9" and 11' and 11", respectively.

Also, in order to better understand the description of the embodiments of the invention, the following definitions will be used.

OTS layer—being the Optical Transmission Section layer, the lowest layer in the optical architecture;

OMS layer—being the Optical Multiplex Section layer; and

OCh layer—being the Optical Channel layer, the highest layer in the optical architecture.

A more detailed description of these layers is given in recommendation G.872.

The OTS layer provides the required functionality for the transmission of optical signals over optical media of various types. The OMS layer provides the required functionality for networking a multi-wavelength optical signal. The OCh layer provides end-to-end networking of optical channels.

Let us now consider the case where a cable break occurs at e.g. the point designated as "A" in FIG. 1. Once such a cable break occurs, the loss Of Signal (LOS) is detected at interface 11", a detection that leads to the operation of ALS unit 13 which operation will be described later on. Operating ALS unit 13, results in intercepting the output of interface 9". The interception of the outgoing transmission from 9" leads in turn to a LOS in 11', consequently followed by operating ALS unit 15 of terminal 5, intercepting the transmission from 9'.

In accordance with an embodiment of the invention, the LOS defined at interface 11" as illustrated in FIG. 1, is detected at the OTS layer. Therefore, the LOS failure is determined only when there is a reduction in power in all channels of the WDM system. The loss of signal occurs only in a single channel (or even possibly a number of channels but not in all of them), cannot happen due to a fiber break nor due to a connector being unplug, and therefore ALS is not required in these cases.

However, when the ALS procedure is activated in the OTS layer according to a preferred embodiment of the present invention, all transmitting channels are intercepted simultaneously.

One way of applying an ALS procedure may be as follows: if a continuous LOS occurs in a pre-defined number of channels for a period exceeding a pre-defined period of time, e.g. after at least 500 msec, the actual interception (or shutdown) command is activated. Activating such a command will result in reduction of optical output power at the transmitter side within a second predefined period, e.g. within about 800 msec from the loss of the optical signal at the receiving side.

Figure 2:
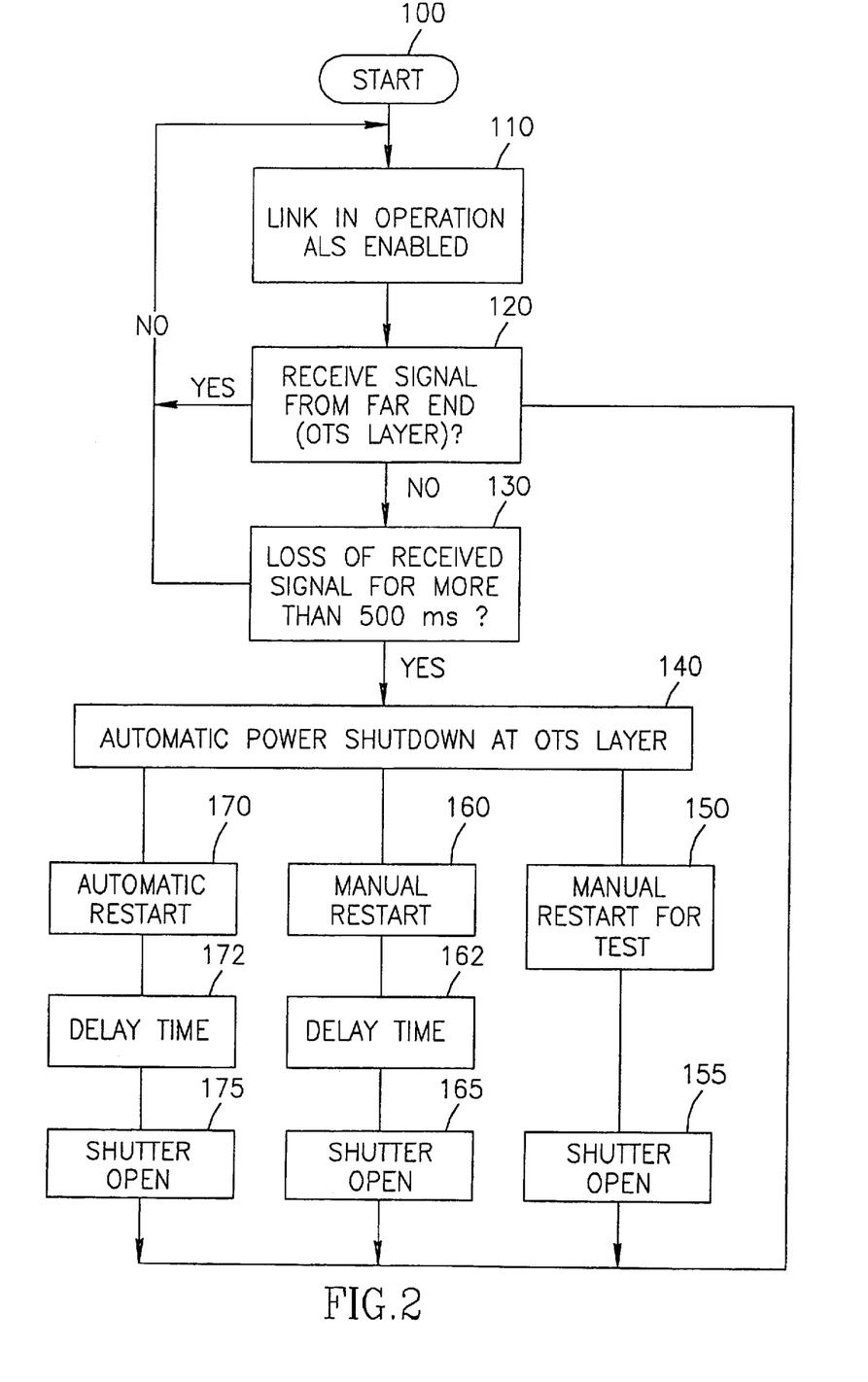
FIG. 2 is a block diagram illustration of a method of operating a system in accordance with an embodiment of the invention.

An example of a shutdown procedure of a system is illustrated in the FIG. 2. The procedure exemplified is as follows: Upon starting the procedure (100) ALS is declared enabled when the link is operative (step 110). A check whether the signal is received from the far end is conducted (120). In the case that the signal is not received for more than 500 ms (130), an automatic laser shutdown procedure is initiated at the OTS layer (140). Typically this step will be completed within 800 ms following the detection that the signal from the far end is not received.

Three options are available to restart the system. One is a manual restart in a test mode (150), by which the transmitter will be on for about 90 sec (155), and than a re-evaluation will be carried to determine whether a signal is received from the far end (step 120). The second option is a manual restart (160), in which after a time delay of about 100 to about 300 sec (step 162) the transmitter will be turned on manually for about 2 sec (165), and than a re-evaluation will be carried to determine whether a signal is received from the far end (step 120). The third option is an automatic restart (170). By this option, after a time delay of about 100 to about 300 sec (step 172) the transmitter will be turned on automatically for about 2 sec (175), and than a re-evaluation will be carried to determine whether a signal is received from the far end (step 120).

Once the reason for the initiation of the ALS has been removed, e.g. the optical fiber has been re-connected, the system can be restarted either automatically or manually. The restart procedure is preferably based on a restart pulse being within Hazard Level 3A limitations, i.e. the allowed emission is limited to a level of +17 dBm signal, in order to minimize the risk of hazardous laser exposure.

As can be appreciated by a person skilled in the art, the ALS procedure described above depends upon detection of LOS at the OTS layer and involves operating ALS procedure in the OTS layer, allowing for a detection of LOS in the optical media(when all channels are lost), followed by shutdown of the entire optical media.

In accordance with another embodiment of the invention, the system provided further comprises a pre-amplifier and a booster, and the LOS detection is preferably carried out at the ingress to the pre-amplifier, ensuring a LOS detection only in cases where all optical power is lost. Upon LOS detection, ALS will be performed at the booster output, thus the transmission in all channels is essentially intercepted simultaneously.

Since the booster and pre-amplifier mentioned above are separate units, a communication link e.g. a bus between them might be required (for example through x-MCP or through a direct connection), so as to forward the LOS detection signal. In addition, the LOS signal is to be provided as an output of the pre-amplifier unit.

In yet another embodiment of the present invention, a pre-amplifier and a booster are not included in the system. Some possible solutions to such a case are:

a) LOS is declared upon essentially simultaneous detection of LOS in all receivers. Although this solution requires no hardware changes, it may be considered more complicated software wise, since all LOS detection (or at least a predefined number of LOSs) should be collected in order to declare an OTS LOS. Similarly, ALS should be performed essentially simultaneously in all transmitters simultaneously, in order to shutdown all channels. This solution offers, although indirectly, an OTS layer ALS.

b) Performing an ALS procedure per channel. For example, in case LOS is detected in channel 1 detector, ALS will be activated for channel 1 transmitter. This way, only in case LOS is detected in all channels, ALS will be activated in all channels, and the LOS at the receiving end of the opposite side terminal, is detected only for the actual channels where a problem in transmission does exist.

This solution transfers the ALS procedure from the OTS to the OCh layer, since it is carried out over single channels. The solution still ensures transverse compatibility with current point-to-point systems, since given shut down of all channels, the receiving end of the opposite side terminal will receive a LOS even if it is detected at the OTS, and can consequently perform ALS at the OTS.

However, the performance of ALS at the OCh layer, implies that an optical channel is being shutdown, although a fiber break has not occurred. Although in point-to-point systems this does not pose a problem, since the channel is not functioning anyway, in future optical systems, this would mean that a channel is shut down although it might be functioning properly between two other network elements. As a consequence, transverse compatibility will not be achieved with optical network elements.

Another disadvantage of such a solution is its reliability. Proper functioning of the system relies on the proper functioning of each one of the different units (e.g. 16 transceivers in a 16 channels system). As today's tendency is towards increasing the number of channels in a system, naturally the problem described above will increase too. Each channel has its own probability of malfunctioning, thus, the overall probability for systems of the known art to undergo a non-necessary shut down, increases dramatically. However, the solution provided by the present invention, which depends only on one LOS detection unit and one ALS procedure, is a generic type of solution, independent of the number of channels in the system.

c) Adding a LOS detection mechanism at the ingress to the de-multiplexer, and an ALS activated mechanism, e.g. a shutter at the egress of the de-multiplexer. This solution would require the management of only one LOS signal and one ALS procedure.

Similarly to the booster and pre-amplifier solution, this solution would preferably also require establishing communication between the multiplexer and de-multiplexer units.

Preferably, the functioning of the ALS at the OTS layer would require disabling the ATS at the OCh layer, i.e. disabling the ALS at the single transceiver.

According to still a further embodiment of the invention, the system described further comprises a protection switching, installed in the electrical domain (MSP or MSP-RING). By this embodiment, the operative channel transmitter responsive to the operative receiving interface is shut down, and correspondingly, the protection channel receiver would shut down the protection channel transmitter.

As was previously mentioned, in some cases the WDM link might include a number of in-line amplifiers, so as to increase the overall length of the transmission path. When a cable break occurs at some point within a single span, between two consecutive in-line amplifiers, not only will the impacted span be shut down but all the spans between the transmitting and receiving system elements. This is due to the fact that the criterion for ALS is the detection of LOS, which can only be done at the receiver end.

The in-line amplifiers have their typical activation and de-activation periods (for example 300 msec activation time and 100 msec deactivation time). Therefore, the shutdown and restart time constants, as mentioned above would not be long enough to ensure proper functioning of the ALS procedure within the WDM link.

Therefore, in order to ensure proper ALS functioning, all of the system elements, including boosters, pre-amplifiers and in-line amplifiers, should preferably have sufficiently short deactivation periods, allowing a shutdown of the complete link within for example 3 seconds from the time the actual interruption in the transmission, occurs.

Similarly, and for the same reason, a longer restart pulse is preferred, for example in the order of about 9 seconds.

As will be appreciated by a person skilled in the art, ALS should preferably be performed at the OTS layer, in order to support future optical network elements and ensure transverse compatibility. Such a solution, which physically performs ALS at the OTS layer, may also ensure future compatibility with all types of optical NE's and is also expected to be the most reliable one.

Figure 3A:
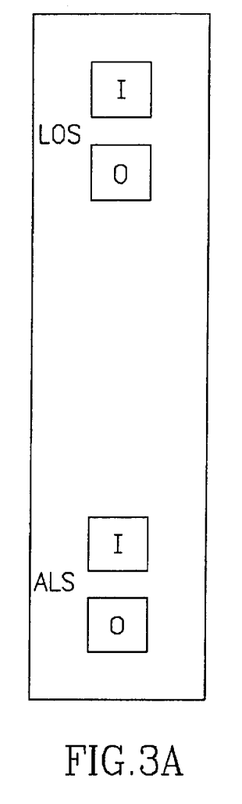
FIG. 3A presents schematically an ALS unit according to an embodiment of the invention.

The ALS unit occupies a single Central Connection Panel ("CCP") slot. The unit typically includes two sets of fiber connectors, each containing one input and one output interface (FIG. 3A).

Figure 3B:
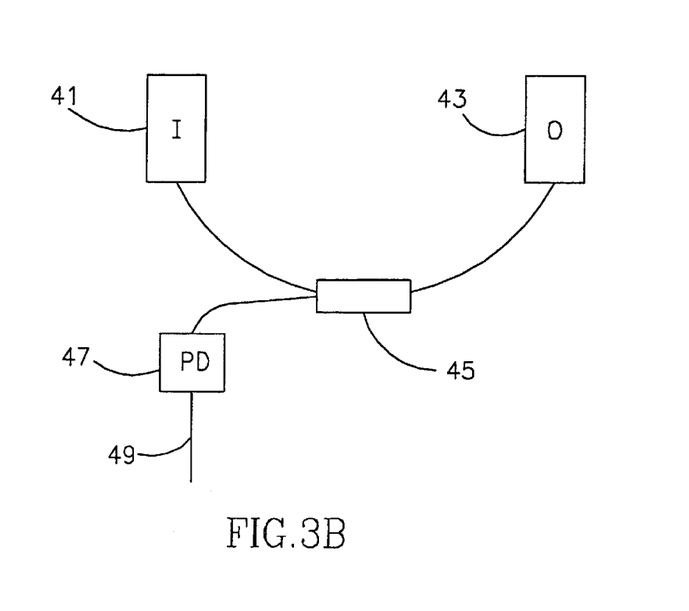
FIG. 3B is a schematic illustration of a LOS detection mechanism.

The first set of I/O interfaces is connected to the incoming fiber from the line direction. The input fiber 41 is connected to the output fiber 43 via a connector 45 having a monitor splice. The monitor output is connected to a Photo Diode ("PD") 47 supplying a monitor signal 49 to the LOS detection mechanism as illustrated in FIG. 3B.

In case the signal in the incoming fiber is lost, for example due to a fiber break upstream, LOS will be detected at the first I/O interface. This LOS detection reflects a complete signal loss in the optical fiber, and will not be detected in cases where communication in some of the channels within the fiber is lost.

The second set of I/O interfaces serves in this example as the ALS mechanism itself. Once LOS is detected, an optical switch located between the input and output fiber is switched to a closed position, thus intercepting the outgoing optical signal. This will in turn cause a LOS detection at the corresponding unit placed at the opposite side terminal, which will in turn trigger an ALS and intercepts the transmission transmitted towards the direction of the broken fiber.

In the following example, an ALS unit comprising the following main components is described:

4 SC fiber connectors, 2 inputs and 2 outputs.

1 fiber connector including a splice tap for LOS monitoring.

1×1 optical switch having two possible positions—block or pass-through.

PD for LOS monitoring.

FPGA for monitoring LOS alarms adapted for enabling/disabling the optical switch blocking.

Flash memory for configuring FPGA at system boot.

DC power supply.

Additional components—e.g. ADC, threshold circuits etc.

Figure 4:
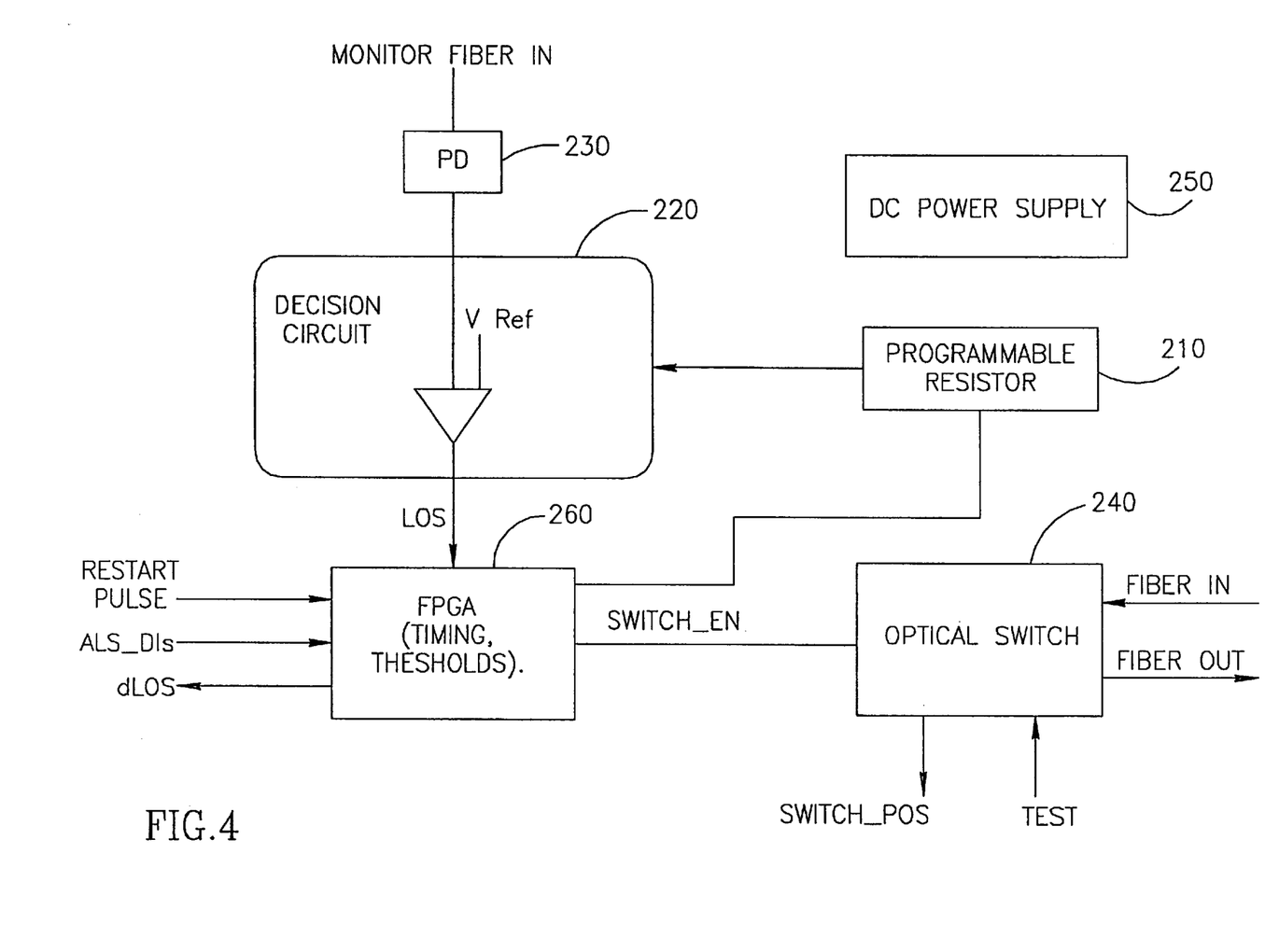
FIG. 4 illustrates a functional block diagram of an ALS unit according to the present invention.

FIG. 4 illustrates a functional block diagram of the ALS unit described. The Figure presents the main functional blocks and their inter-relation, but should not be interpreted as an exact hardware layout. FPGA 200 is the main logic unit that performs the required logical operations, including timing functions, control of ALS disable function, initiating restart pulse, LOS notification, etc. The LOS detection threshold determined by this unit controls programmable resistors 210. In accordance with the value set for programmable resistors 210, $V_{Ref}$ of decision circuit 220 is determined.

The monitor signal is introduced by PD 230 to decision circuit 220, which determines whether a LOS has been detected. When a decision is reached that LOS was detected, the signal is transmitted to FPGA 200, which in turn determines whether the optical switch 240 is to be activated.

Another component shown in FIG. 4 is DC power supplier 250 that receives 48 VDC from the main sub-rack, and supplies 5 VDC to all electrical units of that electric card.

In the following table 1 there are provided some relevant technical specification of the ALS unit.

TABLE 1

| Component | Parameter | Value | Units | Remarks |
|---|---|---|---|---|
| LOS monitor Splice | Insertion Loss | <0.2 | DB | |
| LOS Decision Circuit | Nominal Threshold | −40 | DBm | |
| | Threshold Range | −50–30 | DBm | |
| | Detection Time | <1 | Msec | |
| Optical Switch Unit | Insertion Loss | <0.5 | DB | |
| | Switching Time | <10 | Msec | |

EXAMPLE

As was previously explained and in accordance with the method provided by the present invention, when a loss of signal is detected, the energy received via the optical link is compared with a pre-defined threshold value. When the received energy exceeds that pre-defined threshold, a protection procedure may be carried for at least one of the failing channels, depending upon the protection scheme of the system, e.g. the communication transferred in first failing channel is now transferred via a protection channel. However, if the energy received is lower than the pre-defined threshold value, the appropriate ALS unit is activated to disconnect communication over the entire link. In such a case, a protection may be carried out for the entire failing link. The following example describes the latter case.

In the present example an Optical Protection Module (to be referred to hereinafter as "OPM") is incorporated in the system provided by the present invention. This incorporation of the OPM allows the performing of line protection and IO protection at the optical level.

The OPM unit can be an add-on unit to the ALS unit, thus eliminating the need for additional LOS detection mechanisms and electrical control components.

Figure 5A:
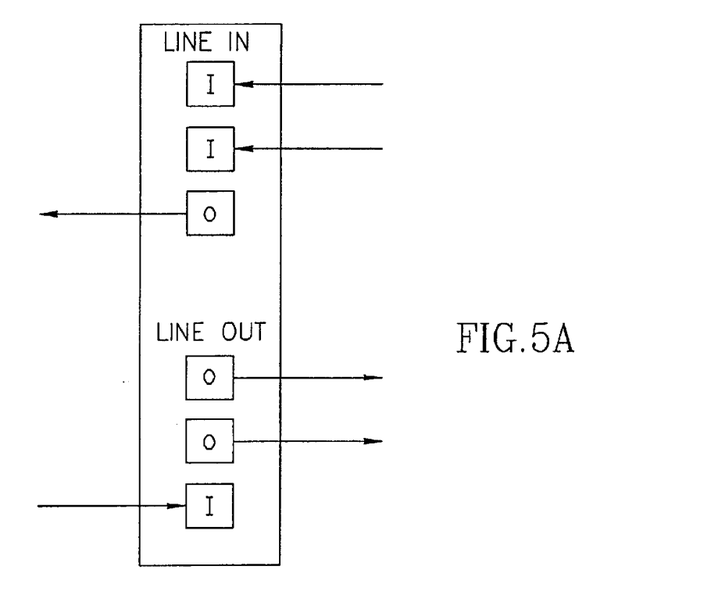
FIG. 5A illustrates a typical configuration of an optical Protection module, where

Typically, the OPM occupies a single CCP slot, forming together with the ALS unit a double slot unit. The OPM unit includes two sets of fiber connectors, each containing 3 fibers. The first set includes 2 fiber inputs and 1 output, while the second set includes 1 fiber input and 2 outputs. Over all, the OPM unit receives 4 fiber from the line direction and 2 fibers from the ALS unit direction. FIG. 5A presents OPM card configuration.

The first set of optical fiber interfaces contains two fiber connectors for two fibers coming from the line direction (one operative and the other for protection) and one output fiber towards the ALS unit card. The two input fibers are connected to a 2×1 optical switch, which alternately can connect each one of the input fibers to the output fibers.

Figure 5B:
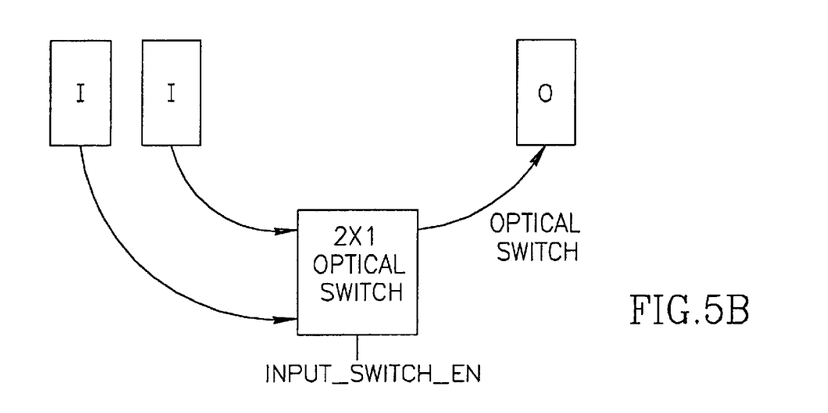
FIGS. 5B and 5C illustrate a configuration of an input optical switch and an output optical switch, respectively.

FIG. 5B depicts the connection between the 2 input and one output fibers.

Figure 5C:
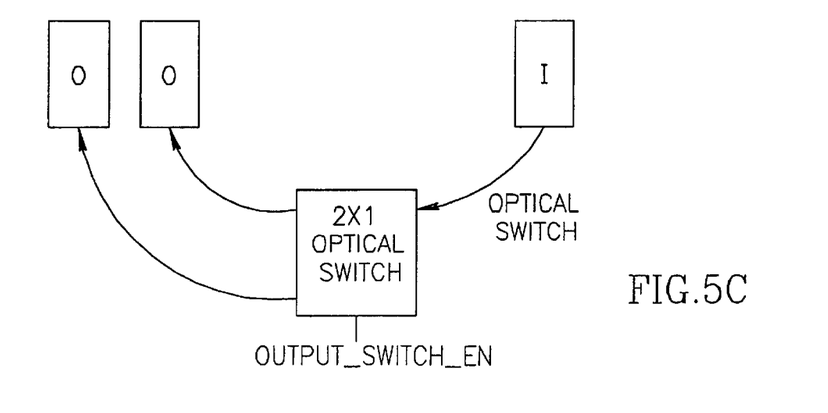

Similarly, the two output fibers of the second set of fiber interfaces are connected to another 2×1 optical switch, which can alternately connect each one of them to the single output fiber. FIG. 5C depicts the connection between the two output and one input fibers.

LOS detection is not required within the OPM unit itself, since the ALS unit can perform the LOS detection operation. This way, the OPM card includes only the two optical switches, and no additional hardware is required.

The use of two optical switches, instead of an optical switch and an optical splitter is intended to avoid the power loss of 3–4 dB, in case the optical signal is splitted between the operative and protective fibers. As will be further shown, although switches are used at both ends, the protection mechanism can operate without exchanging information between the two ends of the system (such as an APS algorithm).

Figure 6:
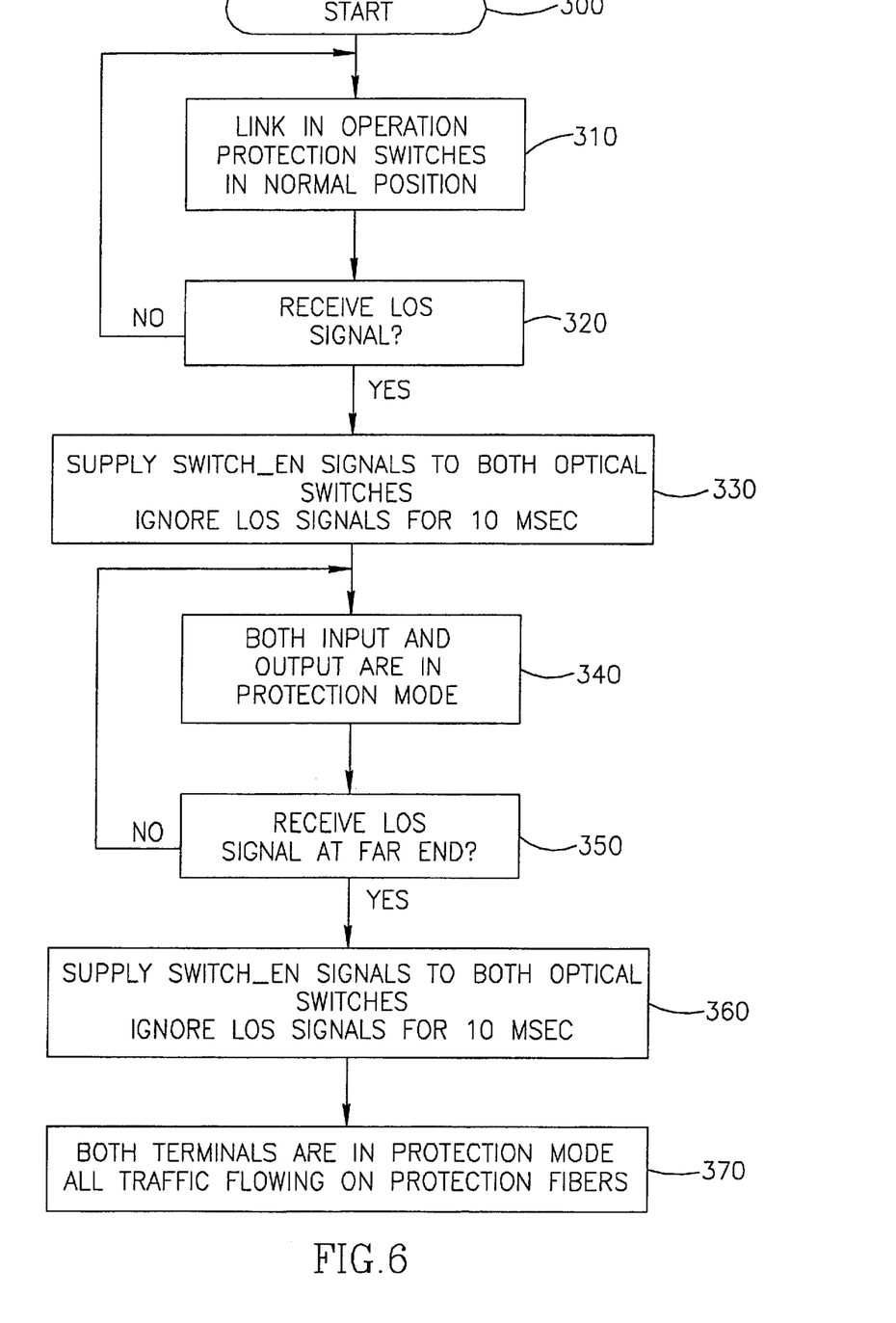
FIG. 6 is a flow chart describing a sequence of events occurring when a protection action is required.

FIG. 6 demonstrates a flow chart of a sequence of events taking place when a link failure occurs and a protective action is required.

Since the required LOS detection time is less than 1 msec, and the optical switch switching time should be under 4 msec, the whole protection procedure could be completed under 10 msec.

The following FIGS. 7A to 7D present the system operation scheme in normal operating mode as well as in the protection mode.

Figure 7A:
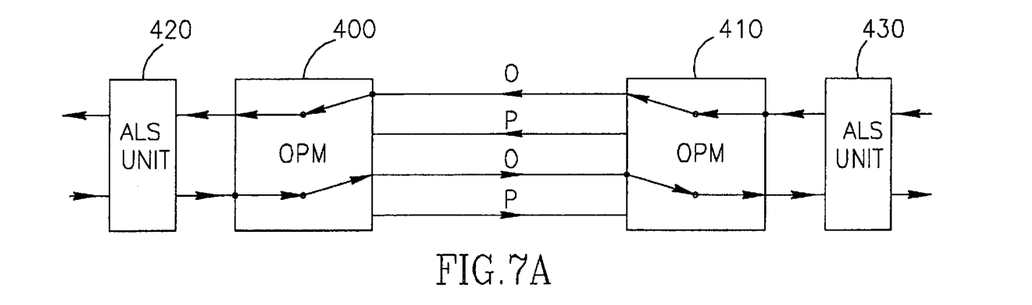
FIGS. 7A to 7D demonstrate operation of a system according to an embodiment of the present invention while switching from normal operating mode to a protection mode.

FIG. 7A presents the system in normal operation mode. The four fibers, two operative and two protection fibers are connected at both ends to OPM units 400 and 410, respectively, which in turn are connected to ALS units 420 and 430, respectively.

Figure 7B:
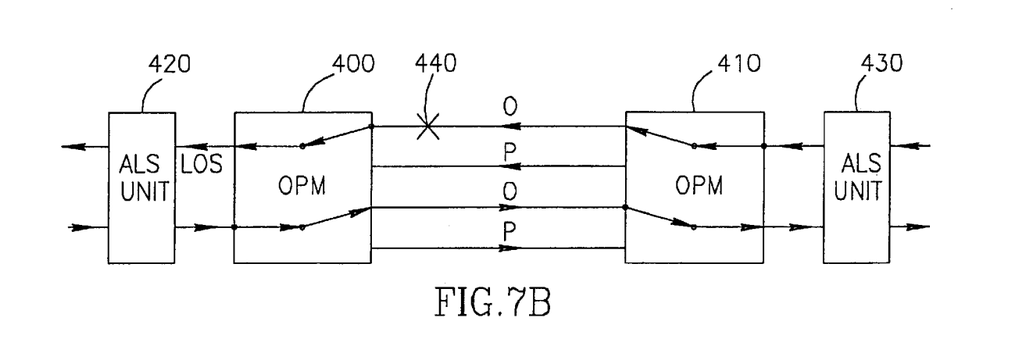
Figure 7C:
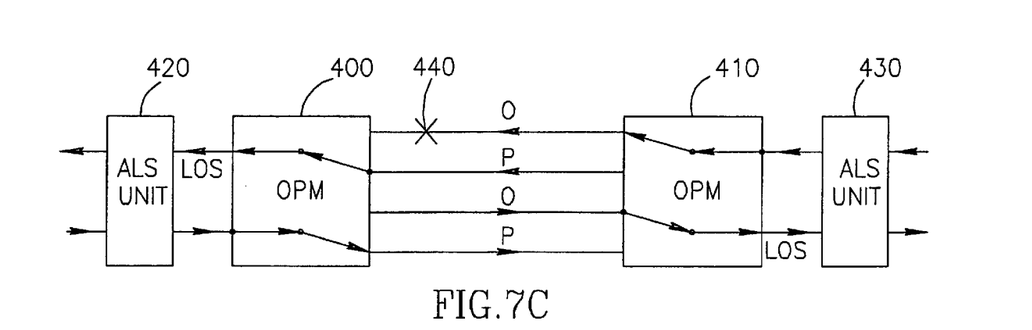

FIG. 7B illustrates the stage that a fiber break occurs in the point designated as 440. The fiber LOS is detected by the ALS unit 420, which performs automatic shut down procedure. Once the shut down procedure is initiated, OPM 400 switches to protection mode as illustrated in FIG. 7C. Such a switch triggers a LOS in ALS unit 430, and once this LOS is detected, OPM 410 will switch too to a protection mode (FIG. 7D), completing the switch of the system to its protection mode.

Figure 7D:
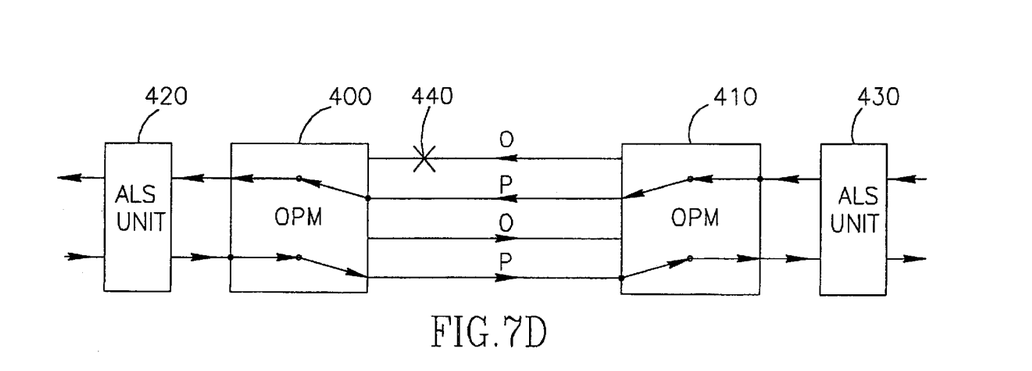

Following the second protection switching, all traffic is transmitted via the protection fibers. The entire operation is typically completed in less than 10 msec, and thus the ALS mechanism will not be triggered (an operation that typically requires about 500 msec). The protection fibers are now connected to ALS unit and therefore if a fiber break occurs on one of the protection fibers, ALS will be triggered and will cause a shutdown of all traffic.

The OPM unit according to the present Example comprises of the following main components:

6 SC fiber connectors, 3 inputs and 3 outputs.

2 2×1 optical switches.

DC Power supply.

No additional components are required in this Example since all the control circuitry is included in the ALS unit.

Figure 8:
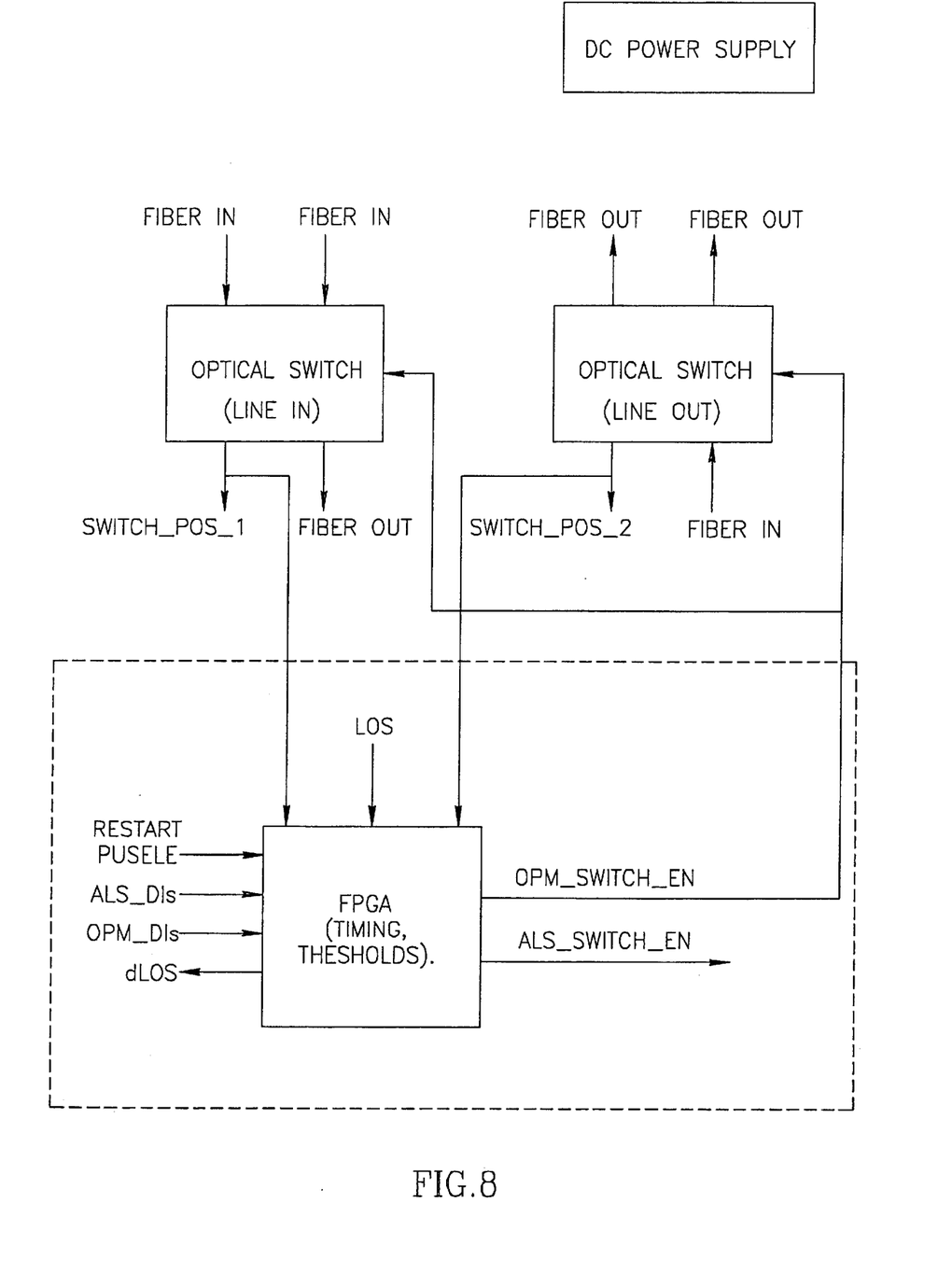
FIG. 8 presents a functional block diagram of an optical protection module according to an embodiment of the invention.

FIG. 8 presents a functional block diagram of the OPM unit. The figure presents the main functional blocks and their inter-relations, and should not be interpreted as a detailed and exact hardware layout.

As mentioned previously, LOS detection will be provided by the ALS unit, through the control FPGA, which will be used for controlling the optical switched onboard the OPM card.

In order to control the OPM unit, additional outputs are required from FPGA onboard the ALS card. Therefore the FPGA is incorporated once again, including the additional signal.

Two main additional outputs are required—OPM_Switch_En and OPM switch position. The OPM_Switch_En signal controls the two optical switches and should change its value from 0 to 1 or from 1 to 0 upon LOS detection. As mentioned previously, the signal should be kept fixed for 10 msec, although LOS is still being detected, in order to enable completion of the protection action.

The following table 2 lists some relevant technical specification of the OPM unit.

TABLE 2 technical Specifications of the OPM unit

| Component | Parameter | Value | Units | Remarks |
|---|---|---|---|---|
| Optical Switch Unit | Insertion Loss | <0.5 | dB | |
| | Switching Time | <4 | msec | |
| | Switch_Pos | 0 - Switch in Normal Position<br>1 - Switch in Protect Position | | |
| FPGA | OPM_Switch_En Hold off time. | 10 | msec | Ignore LOS detection until completion of protection action. |

It will be appreciated that the above-described methods may be varied in many ways, including but not limited to, changing the exact implementation used. It should also be appreciated that the above described description of methods and systems are to be interpreted as including system in which the methods are carried out and methods of using the system components.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all the features shown in a particular figure. Variations of embodiments described will occur to persons of the art. Furthermore, the terms "comprise", "include", "have" and their conjugates, shall mean, when used in the claims. "including but not necessarily limited to".

What is claimed is:

1. An optical transmission system comprising a plurality of telecommunication channels extending between first and second locations, wherein a plurality of channels are operative for carrying traffic in normal operating mode from said first location to said second location and at least one channel is adapted to operate as a protection channel, characterized in that when a failure occurs in one or more of said telecommunication channels, the operation of the non-failing telecommunication channels and at least one of the failing channels from which traffic is transferred via said at least one protection channel may continue, provided that the overall transmitted energy in the non-failing telecommunication channels exceeds a pre-defined threshold, wherein at least of a plurality of channels operative for carrying traffic in normal operating mode is assigned a higher priority than at least one other channel of the plurality of channels operative for carrying traffic in normal operating mode, wherein in the event that a failure occurs in said higher priority channel, the traffic to be transmitted via said failing channel is transmitted via said lower priority channel.

2. A method for transmitting traffic to a protection route in an optical transmission system comprising a plurality of forward telecommunication channels extending between a first and a second locations carrying traffic in normal operative mode from the first location to the second location wherein at least one of said plurality of forward telecommunication channels is assigned a higher priority than at least one other channel of said plurality of forward telecommunication channels, wherein in the event that a failure occurs in said higher priority channel, the traffic to be transmitted via said failing channel is transmitted via said lower priority channel, provided that the overall transmitted energy in the non-failing channels exceeds a pre-defined threshold.

* * * * *